July 5, 1938.  O. U. ZERK  2,123,130

VEHICLE WHEEL

Filed Sept. 8, 1931  4 Sheets-Sheet 3

INVENTOR.
Oscar U. Zerk
BY
Kwis Hudson & Kent
ATTORNEY.

Patented July 5, 1938

2,123,130

UNITED STATES PATENT OFFICE 2,123,130

VEHICLE WHEEL

Oscar U. Zerk, Cleveland, Ohio, assignor, by mesne assignments, to Budd Wheel Company, Philadelphia, Pa., a corporation of Pennsylvania Application September 8, 1931, Serial No. 561,541

11 Claims. (Cl. 301—9)

This invention relates to an improved sheet metal wheel adapted particularly for automobile or vehicle use, and is an improvement on and is designed to replace wheels of various kinds which are being used at the present time and among which are disk wheels, wire wheels, wooden wheels, cast wheels, and certain forms of stamped sheet metal wheels.

In my copending application Serial No. 554,482, filed August 1, 1931, I have described the disadvantages of the above mentioned types of wheels now in use, and I have also described a novel form of sheet metal wheel which overcomes the disadvantages of the present wheels of the various kinds mentioned and which possesses their advantages. The wheel of said copending application is preferably formed of three main parts, including a rim, a spoke stamping of novel and distinctive type forming spokes which are designed to be attached to the rim by suitable means, as by welding, and which at their inner ends merge into and form the outer hub, and a third main part also preferably in the form of a stamping which is attached to the outer hub of the spoke stamping, preferably by welding, and constituting the wheel attaching member which is designed to be interlocked with and secured to the flange of the inner hub, this wheel, therefore, having a single supporting flange.

The present invention embodies the major portion of the novel features of my prior wheel but contains a further adaptation of the principles involved therein in the respect that, while the wheel of my prior application is designed to be secured to a single flange of the spindle bearing or inner hub, the wheel of my present application is better adapted for use in connection with heavier kinds of vehicles inasmuch as it is constructed and designed for connection to and/or support on two spaced supporting portions of the inner hub, which supporting portions may be flanges located at or adjacent the outer and inner ends of the hub. The construction is such that the support at the inner end acts simply to absorb the vertical load, while the support at the front or outer end of the hub absorbs both vertical and torsional stresses or loads. The present construction follows the design and construction of my prior application in the respect that the wheel fastening bolts are located in a manner such as to be covered by the outer hub cap and are therefore not visible, but in the present instance the outer end of the outer hub is now bolted to the flange or other support located near the outer end of the inner hub, and the bolts are positioned just inside of or closely adjacent the outer hub cap.

The principal object, therefore, of the present invention is to provide a wheel having a spoke and outer hub unit in the form of a stamping substantially as in my prior application but having provision for engagement with inner and outer flanges or portions of the inner hub. In brief, it is the main object of the present invention to provide a wheel having all the advantages of the wheel of my prior application, such as minimum number of parts, ease of production, strength and durability, and pleasing appearance, but which is better adapted for heavier vehicles and has provision for engagement or connection with supports at both the outer and inner portions of the inner hub.

The above and other objects are attained by the present invention in several different specific ways, which, when embodied in my improved wheel, constitute or create different forms of the invention, at least part of which I have herein illustrated. In one form of the invention, the outer end of the outer hub, which is a continuous or annular part thereof, is bolted to a part such as the front flange of the inner hub, and at the inner end of the outer hub where the latter is non-continuous and is formed by the concavo-convex portions of the stamping which lie between the spokes, the wheel is supported by the inner flange of the inner hub preferably by a pressed sheet metal member which is welded or otherwise secured to the outer hub portion of the spoke stamping.

The sheet metal supporting portion which is thus secured to the outer hub of the spoke stamping may assume widely different forms. In one instance, this stamping is in the form of a star arranged at the inner side of the wheel and comprises an annulus preferably cone-shaped which is adapted to engage the flange at the inner end of the inner hub and also comprising arms which extend outwardly and are secured by welding and thus close the inner open sides of the U-shaped spokes. It will be understood that the cone-shaped portion of this stamping is pressed onto a correspondingly tapered or conical portion of the flange at the inner end of the hub at the same time that the front end of the outer hub of the spoke stamping is bolted to the flange at the outer end of the hub.

Instead of directly bolting the outer inturned portion of the outer hub of the spoke stamping to the flange at the outer end of the hub, I may form the extreme outer inturned end of the outer hub by a separate and preferably thicker and stiffer stamping in the form of a cup which may be secured, as by welding, to the outer hub portion of the spoke stamping. When this expedient is employed, suitable portions of the cup and flange at the outer end of the inner hub may be tapered and arranged to be interlocked, this interlocking feature of course being in addition to the bolts which secure the wheel to the flange at the outer end of the inner hub.

Instead of having the supporting stamping which is secured to the inner part of the wheel and which is adapted to engage the flange at the inner end of the inner hub, in the form of a star, as when it is desired that this stamping close the inner open sides of the U-shaped spokes, this supporting stamping may be merely in the form of an annulus which is wholly on the inner side of the outer hub, in which event it preferably is composed of a flange which is secured, as by welding, to the concavo-convex portions of the spoke stamping which lie between the spokes, and a second flange extending inwardly and having a conical portion which is designed to engage a conical portion of the flange at the inner end of the inner hub.

In still another embodiment of the invention, both the attaching and supporting portions may be formed by an extended cup-shaped member in the form of a bushing which is secured, as by welding, to the inner surface of the outer hub and extends for its full length with its front or outer part turned in so that it may engage and be bolted to the front flange of the inner hub and its rear or inner part adapted to rest on the conical periphery of the flange at the inner end of the inner hub.

As a still further embodiment, this extended cup-shaped member, which may be pressed from sheet metal and is preferably conically formed where it lies within the outer hub, may have its inner end provided with arms extended radially outward to the rim of the wheel so as to close the spokes.

The above and other features constitute the present invention, which may be here briefly summarized as consisting in certain novel details of construction and combinations and arrangements of parts which will be described in the specification and set forth in the appended claims.

In the accompanying sheets of drawings illustrating the above mentioned forms of the invention.

Referring now to the drawings, and first to Figs. 1 to 5, 20 represents the rim which may be formed of a rolled section, as is customary, although the rim itself embodies certain novel features which will be referred to after the description of the wheel in its various forms. The second element of the wheel is stamped from sheet metal and is composed of spokes 21, of which there may be any number, but preferably a reduced number, such as five, six or seven, six being herein illustrated, these spokes at their inner ends merging into and in effect forming the outer hub portion 22 of the stamping. In my construction, what I term the outer hub is the inner portion of the spoke stamping which is continuous at its outer end but non-continuous at its inner end, the non-continuous portions resulting from the hollow spaces formed by the outwardly extending spokes. Though the outer hub may be in some instances made cylindrical, it is in this instance conically formed. It will be observed that the rim has a drop section 20ª at the middle thereof and that the inner wall of this drop portion is tapered. Likewise, the outer ends of the spokes are correspondingly tapered, these tapers being provided to facilitate welding, as stated in my prior application above referred to. The outer ends of the spokes have inwardly inclined protuberances 21ª (see particularly Figs. 2 and 3) which engage the inclined wall of the rim during the welding operation as the spokes are moved inside the rim and are melted away to effect the welding.

I prefer to use in the manufacture of the spoke stamping a thin sheet steel of about one-sixteenth inch thickness or less which does not readily crystallize, that is, steel of high fatigue value and high endurance limit, such as chrome nickel steel, having a tensile strength of about 140,000 pounds per square inch. The spokes 21 are substantially U or trough-shaped with the opening of the trough on the inner side of the wheel. The sides of the spoke are flared outwardly, the purpose being not only to facilitate welding and make a clean joint, but also to enhance the strength of the welded joint to resist torsional or circumferential stresses to which the weld is subjected in transmitting the driving load. Additionally, the spokes, when viewed from the front or rear, are flared in both directions from a point intermediate the ends of the spoke, i. e., the spokes being smaller in cross-section intermediate their ends than at their outer or inner ends, this flaring being desired to give the desired surface contact between the spoke ends and the rim and also to provide a not too great overhang of the rim between the spokes. Likewise, the relatively narrower intermediate point in the spoke gives to the spoke a certain degree of resilience, as is desired.

The closed wall or back of the U is on the outer side of the wheel, and this, it will be seen flares outwardly from the outer end of the spoke to the inner end where the spokes form the outer hub portion 22.

In my prior application, the third part of the wheel constituted a wheel attaching member in the form of a stamping having an outer conical flange welded to the concavo-convex portions of the outer hub 22 and having an inwardly extending flange which was designed to be interlocked with and bolted to a flange of the inner hub substantially in the plane of the rim or about midway of the sides of the tire. As stated above, in accordance with the present invention, two supports are provided on the inner hub which, in this instance, is designated 23, the hub having near its outer end an outer flange 24 and near its inner end a second flange 25. With the form of the invention illustrated in Fig. 1, the continuous outer end of the hub is provided with an inwardly extended flange 26 which is secured by bolts 27 to the outer flange 24 of the inner hub. A hub cap 52, which may be of usual construction and which is applied in the well known manner, conceals the bolts 27 from view when the cap is applied. The bolts 27 have conical head portions which engage in conical depressions formed in the flange 26 (see Fig. 1), and the extreme inner edge of the flange 26 bears against the outer face of the flange 24 of the inner hub inside the bolts 27.

Figures 1, 2, 3, 4, 5, 6:
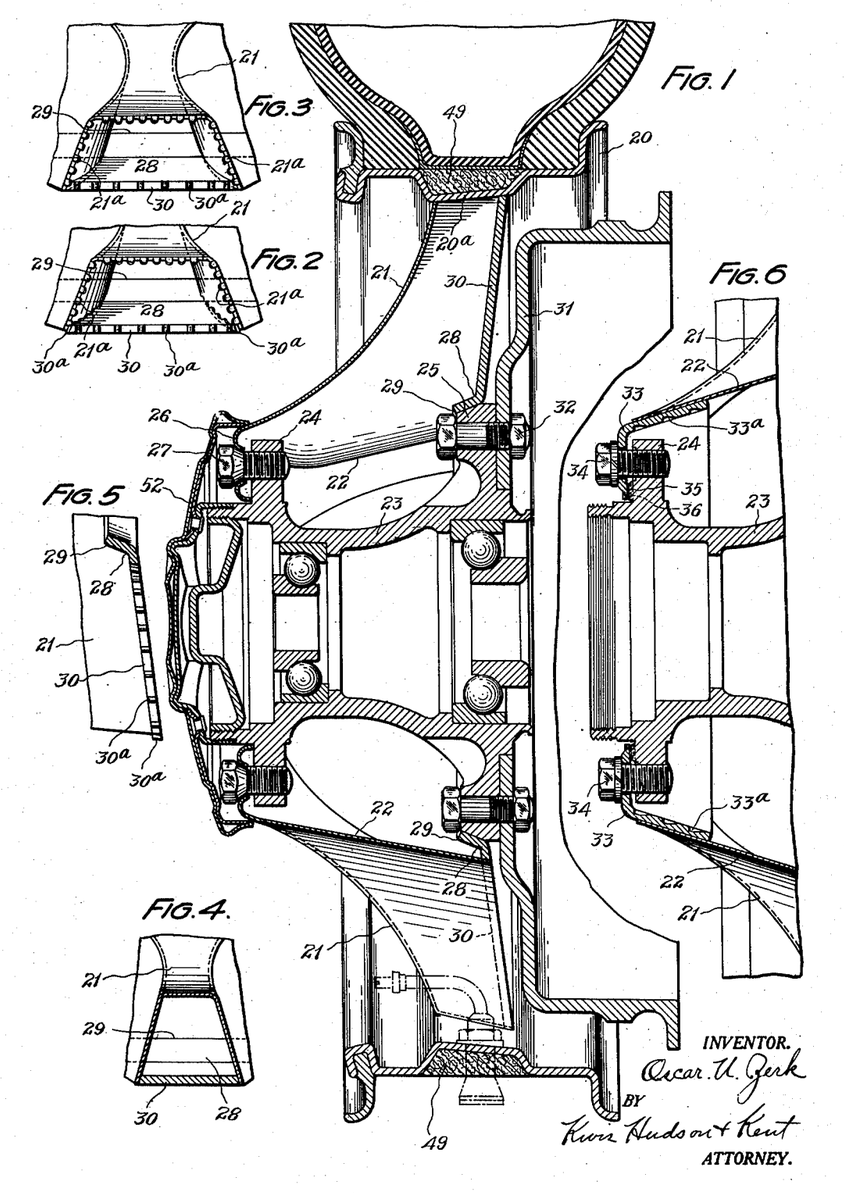
Figure 1 is a sectional view through the wheel in one of its forms with the upper part of the section taken through one of the spokes and the lower part taken between the spokes substantially along the line A—A of Fig. 9.
Fig. 2 is a view looking down on the open outer end of one of the U-shaped spokes at the beginning of the welding operation wherein an arm of a star-shaped member is welded to the spoke so as to close the open inner side and also welded to the rim.
Fig. 3 shows the same at the completion of the welding operation.
Fig. 4 is a section through a spoke substantially along the line B—B of Fig. 9.
Fig. 5 is a fragmentary section between two radially extending spoke closing members or arms of the star-shaped member, this view showing, along the side of the arm, welding protuberances.
Fig. 6 is a sectional view similar to Fig. 1 showing the outer end of the wheel and inner hub, both parts being modified slightly by reason of the fact that the outer end of the outer hub is formed by a reenforcing member in the form of a cup which is welded to the outer hub, this reenforcing member having an inwardly extending flange which is designed to be fastened by screws or bolts to the front flange of the inner hub, the flange of the reenforcing member being provided just inside the bolts with an annular series of corrugations or serrations which fit into similar corrugations formed on the hub flange.

In accordance with the form of the invention illustrated in Fig. 1, the wheel is further supported on the inner hub 23 by a star-shaped member 28 having a continuous inner conical flange 29 which is adapted to rest upon the conical outer periphery of the inner flange 25 of the inner hub. The engagement between the flange 29 of the star-shaped member 28 and of the inner flange 25 takes place when the bolts 27 are tightened, as is obvious. This star-shaped member is secured to the spoke stamping, and in this instance it is provided with a plurality of arms 30 which close the inner open sides of the U-shaped spokes 21. In this instance, the sides of the arms 30 are welded between and to the rear or inner margins of the sides of the spokes and also are welded to the rim. For this purpose, they are provided along their sides and outer ends with protuberances 30ª which engage the sides of the spokes and the rim and are melted away in the welding operation, the welding occurring when the star member is moved relative to the spokes and rim with the protuberances engaging the tapered sides of the spokes and the tapered wall of the drop portion of the rim.

It will be observed that the inner conical continuous portion 29 of the star-shaped member which engages the inner flange of the inner hub is located inwardly of or about the center of the rim 20. Thus this member transmits to the inner flange 25 of the inner hub the major portion of the vertical load stresses, while the inturned flange at the outer end of the outer hub transmits to the outer or front flange 24 of the inner hub some of the load stresses and also the driving or torsional stresses.

As shown in Fig. 1 and also with all forms of the invention, a brake drum 31 is secured by bolts 32 to the inner flange 25 of the inner hub.

Figures 7, 8, 9:
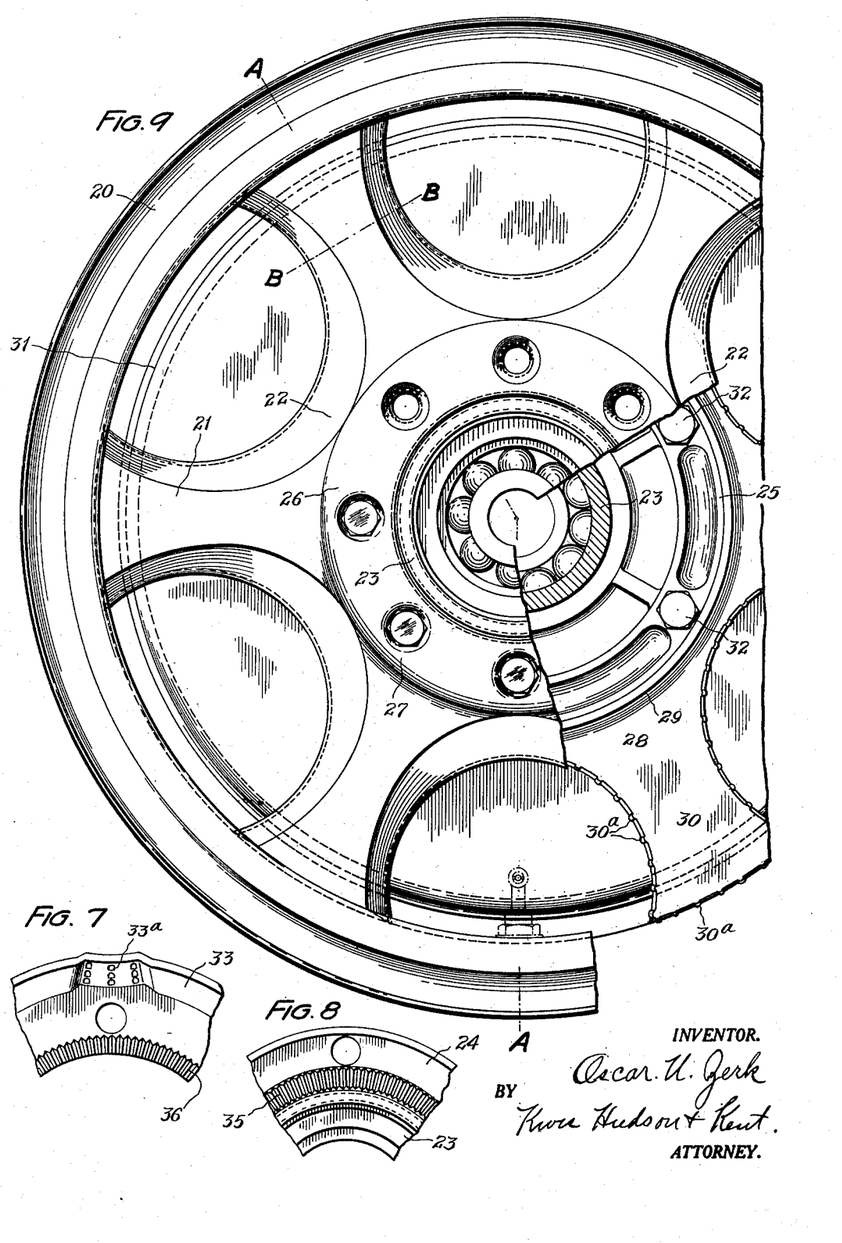
Fig. 7 is a fragmentary portion of the reenforcing member looking toward the inner side and showing the corrugations or serrations referred to above.
Fig. 8 is a fragmentary view showing the flange at the outer end of the inner hub looking toward the outer side thereof and showing the corrugations or serrations which interfit with those of the reenforcing member.
Fig. 9 is a view looking toward the outer side of the wheel, the hub cap being removed, and with a portion of the spoke stamping broken away to show a portion of the star-shaped closure member.

The construction shown in Fig. 1 may be modified in many ways without departing from the spirit of the invention. For example, in Fig. 6, instead of having the outer hub itself turned inwardly so as to be connected to the outer or front flange 24 of the inner hub, there is attached to the outer hub of the spoke stamping, preferably by welding, a reenforcing cup-shaped member 33 having a conical outer portion engaging the conical outer hub 22 of the spoke stamping. Preferably this reenforcing member 33, which is formed of thicker metal than the spoke stamping, as is obvious from Fig. 6, is provided with a plurality of protuberances 33ª (see Fig. 7) which are caused to engage the conical wall of the outer hub 22 of the spoke stamping and to be melted away as the two conical members are moved relatively during the welding operation with the protuberances slidingly engaging the outer hub 22. This reenforcing member has an inturned flange which is secured by bolts 34 to the outer flange 24 of the inner hub. If desired, the flanges of the reenforcing member and of the hub may be interlocked to relieve the bolts 34 of all or the major portion of the torsional stresses. One way of accomplishing this is shown in Figs. 6, 7 and 8 wherein the inner portion of the flange 24 inside of the bolts 34 is provided with a row of protuberances consisting of an annular series of corrugations or serrations 35 with radially disposed tapered faces and the inturned flange of the reenforcing member 33 is provided with a similar annular row or series of corrugations or serrations 36 pressed into the flange and having correspondingly tapered radial sides. These interfit and are drawn together when the bolts 34 are drawn tight and preferably constitute the sole engaging portions of the two members thus bolted together, the bolts preferably having a clearance in the holes of the flange of the reenforcing member 33. Obviously the interlocking feature illustrated in Fig. 6 may be utilized with the other forms of the invention herein illustrated, particularly where a similar reenforcing member is employed, such, for example, as illustrated in Figs. 10, 14 and 15.

The protuberances 33ª, which are melted away during the welding operation as just stated above, are preferably arranged in groups, each group being on a concavo-convex portion (see Fig. 7) adapted to engage a concavo-convex portion of the outer hub 22 at and adjacent the continuous outer end of the hub 22.

Figures 10, 12, 13, 14:
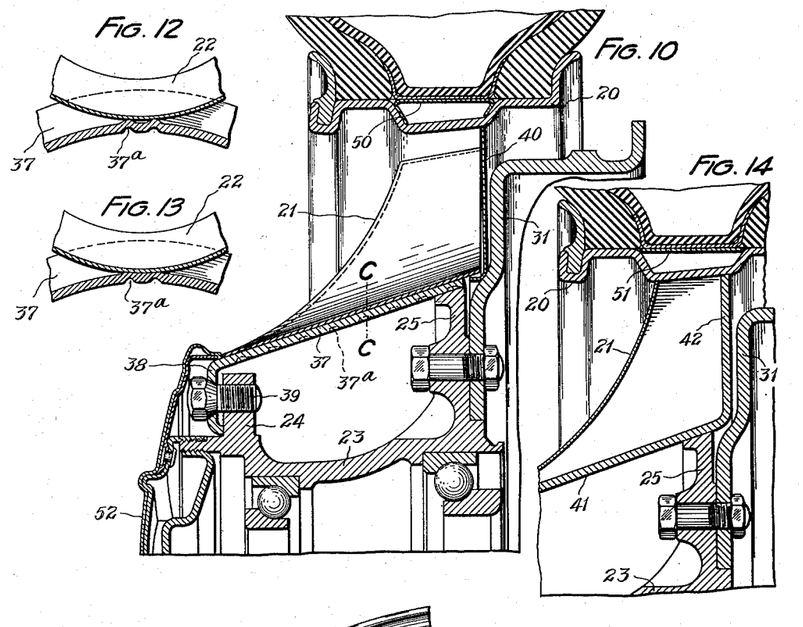
Fig. 10 is a cross-sectional view through one-half of the wheel showing a modification wherein the star-shaped closure member is omitted and wherein the outer hub of the spoke stamping has welded inside thereof a conically shaped supporting cup or barrel having at the outer end an inturned flange which is bolted to the outer flange of the inner hub and adapted at its inner end to be pressed against the conically shaped periphery of the inner flange of the inner hub.
Figs. 12 and 13 are fragmentary sectional views substantially along the line C—C of Fig. 10, the section being taken between two spokes, these two views showing the parts before and after the welding operation by which the conical cup of Figs. 10 and 11 is welded to the hub of the spoke stamping.
Fig. 14 shows a construction similar to Fig. 10, wherein the conical cup of Fig. 10 is modified to the extent that the inner or rear end is provided with radial arms which are designed to be welded into the open inner sides of the U-shaped spokes of the spoke unit and also to the rim, as in Figs. 1 to 5 inclusive.
Figure 11:
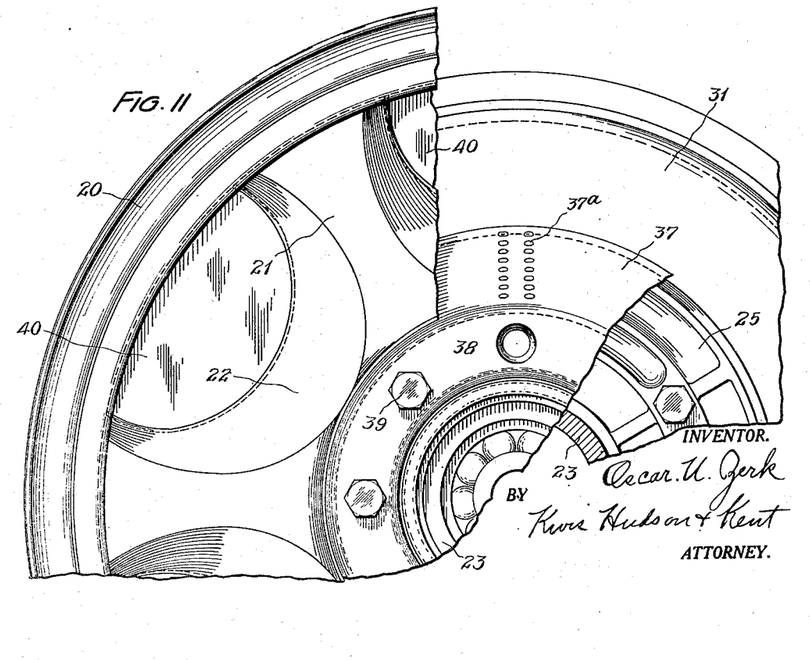
Fig. 11 is an outer side view of the wheel shown in Fig. 10, with part of the rim and part of the spoke unit broken away, showing the conical cup or barrel of Fig. 10.
Figure 15:
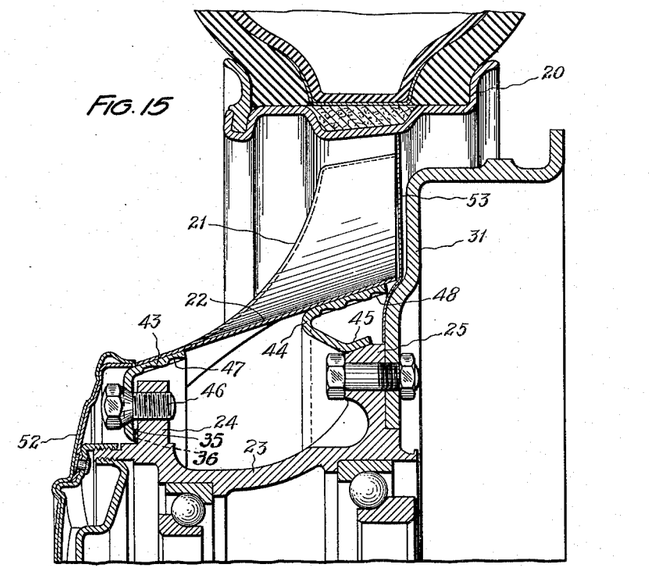
Fig. 15 shows a cross-section through one-half a wheel having a supporting and attaching member welded to the outer end of the hub of the spoke stamping and a second supporting member welded to the inner end of the hub of the spoke stamping, these two members being adapted respectively to be bolted to and to engage flanges at the outer and inner ends of the inner hub.

With the reenforcing member 33 shown in Fig. 6, the inner support may be formed by the star-shaped member 28 of Fig. 1 or it may be otherwise formed as shown in Figs. 10, 14 and 15. In Fig. 10, substantially the entire length of the outer hub 22 is reenforced by a conical cup or barrel 37 which is secured to the hub preferably by being welded to the latter along the center lines of the innermost parts of the concavo-convex portions between the spokes of the spoke stamping. Rows of protuberances 37ª may be formed on one or the other part, such as on the reenforcing cup 37, to permit the latter to be uniformly welded to all the concavo-convex portions of the spoke stamping midway between the spokes. The arrangement of the protuberances may be as indicated in Figs. 11, 12 and 13. If desired, where the groups of protuberances 37ª are provided, the cup 37 may be given a concavo-convex form to correspond to that of the adjacent portions of the outer hub of the spoke stamping in the manner indicated by the somewhat different form of the invention illustrated in Figs. 15 and 16. With the form of the invention illustrated in Figs. 10 to 13, the reenforcing cup 37 is provided at its outer or front end with a depending flange 38 having bolt holes formed therein with conical walls, and an inturned lip at the inner periphery of this flange is drawn against the front side of the outer flange 24 of the inner hub by bolts 39 having conical heads which fit the conical portions of the bolt holes in the flange 38. At the same time that the front flange is drawn up against the outer flange 24, the conical inner or rear part of the reenforcing cup 37 is caused to engage the conical outer periphery of the inner flange 25 of the inner hub. In this instance, the rear sides of the U-shaped spokes may be closed by a closure plate 40 which is held in place by the brake drum 31.

In Fig. 14 I have illustrated a construction which is identical with that shown in Fig. 10, except that the inner end of the reenforcing cup, which is here designated 41, is star-shaped and is provided with arms 42 which close the U-shaped spokes and are welded to the inner portions of the flaring sides thereof and also to the rim, precisely as indicated in Figs. 2 and 3. In other words, in Fig. 14 I have combined into one piece the reenforcing cup 37 of Fig. 10 and the star-shaped support 28 of Fig. 1. This reenforcing member 41 is secured to the outer hub 22 of the spoke stamping precisely as in Fig. 10, and the inner arms are secured to the rim and spokes as in Figs. 1 to 5. Likewise, this member 41 will bear upon the conical portion of the inner flange 25 of the inner hub and will be connected to the outer flange 24 of the inner hub precisely as in Fig. 10, the engagement with the inner flange 25 being shown in Fig. 14, but the connection with the outer flange 24 being omitted. If desired, the constructions shown in Fig. 1 and in Fig. 14 may have a closure plate similar to and held in place as in Fig. 10.

Figure 16:
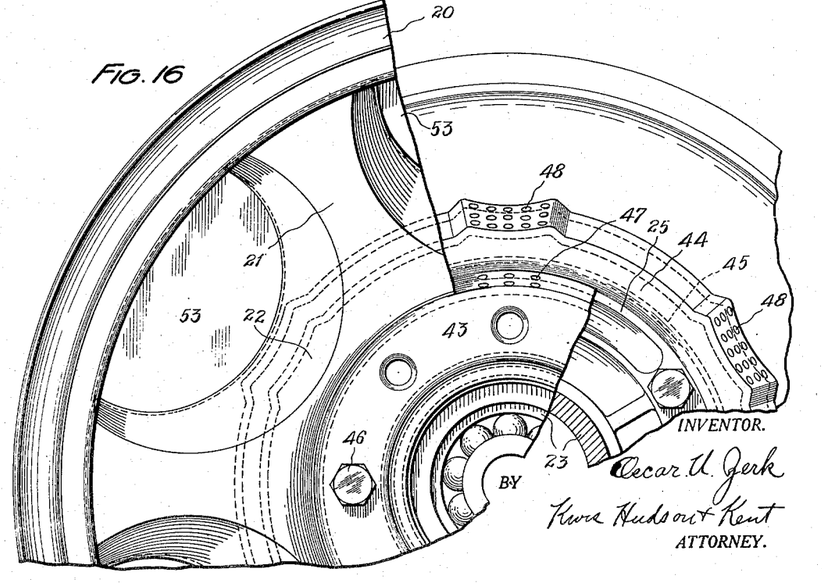
Fig. 16 is a side view of one-half the wheel shown in Fig. 15 with the hub cap removed and with part of the spoke stamping, rim and back cover plate broken away and in another portion the outwardly situated reenforcing member and outer flange of the inner hub broken away.

In Figs. 15 and 16 the outer hub of the spoke stamping is provided at its outer end with a reenforcing cup 43 which is like that shown in Fig. 6 and is connected to the front or outer flange 24, of the inner hub, as shown in Fig. 6. Likewise, the inner portion of the inturned flange of the cup 43 is interlocked with the flange 24 of the inner hub, the two parts having interlocking projections 35 and 36 as in Fig. 6, but it will be understood that the inner portion of the flange of this cup may simply bear against the front face of the flange 24 of the inner hub, as in Fig. 10. Additionally, the outer hub of the spoke stamping of Fig. 15 is provided near its inner or enlarged end with a supporting stamping 44 having an outer flange which is welded to the outer hub and having an inturned flange with a conical portion 45 which is adapted to seat upon the inner flange 25 of the inner hub at the same time that the front reenforcing cup is drawn by bolts 46 against the front flange 24. In this instance, the outer conical portion of the reenforcing cup 43 is welded to a continuous conical portion at the end of the outer hub. Protuberances 47 will be formed on one or the other of the two parts, as indicated in Fig. 16, to facilitate the welding operation, but in this instance, unless part of the reenforcing cup extends beyond the smooth continuous conical portion so as to overlap the concavo-convex portions between the spokes, the cup need not be deformed in the regions of the protuberances since the conical portions will match and engage each other without this deforming operation. To facilitate welding the inner support 44 to the outer hub 22, groups of protuberances will be formed on one or the other of the parts where the welding is to take place between the spokes, and, as illustrated in Fig. 16, the protuberances, here designated 48, are formed on the member 44 which is deformed in the region of the protuberances so as to be provided with concavo-convex portions to correspond in shape and taper with the corresponding portions of the outer hub to which the member 44 is to be welded. In Fig. 15 I show a closure plate 53 on the inner side of the wheel, the same being held in place by the brake drum, as before. It will be understood that, in all instances where a closure plate such as shown at 40 and 53 is employed, it may, if desired, be held in place by spot welding.

In all the different forms of the invention where the outer hub of the spoke stamping is provided with one or more separately formed members which engage the inner hub, the member or members thus secured to the outer hub by welding or otherwise preferably consist of stamped or drawn sheet metal members preferably somewhat thicker than the spoke stamping itself, as indicated in the drawings.

In all instances where the wheel attaching and supporting member or members are welded to the outer hub of the spoke stamping, protuberances are provided on one or the other member, as previously stated, to facilitate the welding operation. As herein illustrated, the protuberances are shown as provided on the member which is to be welded to the outer hub, and in some instances such member is deformed so as to be provided with concavo-convex portions to correspond to the concavo-convex portions of the outer hub between the spokes. If desired, the protuberances may be provided on the outer hub instead of on the member to be welded to it, and portions of the outer hub between the spokes may be deformed so as to fit the conical surface of the member which is to be welded to it.

With all forms of my invention, when the wheel is applied and is being secured to the inner hub, it is practically inevitable that the outer hub, which at least for purposes of this explanation may be considered as a unit, will not simultaneously engage the flange at the outer end of the inner hub and the flange at the inner part of the inner hub, but the outer hub will first engage one or the other of these flanges, after which, as the nuts are tightened, solid engagement will take place with the other flange in the following manner.

If it be assumed that the inturned flange at the outer end of the outer hub engages the outer flange of the inner hub, before the outer hub engages the flange at the inner part of the inner hub, then when the nuts are tightened the line of engagement between the inwardly extending flanged portion of the outer hub with the flange at the outer end of the inner hub will act substantially as a fulcrum and the outer part of the outer hub will flex at or adjacent the point where the conical portion of the hub begins so that the body portion of the hub and, therefore, the wheel will be caused to move inwardly until the outer hub solidly engages the flange at the inner part of the inner hub. Conversely, should the engagement take place between the outer hub and the flange at the inner part of the inner hub, as the nuts on the attaching bolts are tightened, the outer part of the outer hub will flex at and in the vicinity where the nuts engage it until the inturned flange at the outer end of the outer hub solidly engages the flange at the outer end of the inner hub.

From the foregoing it will be noted that I have herein provided an improved wheel constructed entirely by sheet metal stamping processes wherein a wheel body comprising a spider which is made of a single sheet of sheet metal, said spider comprising an outer hub or nave portion 22, which is of a deeply dished generally conical form, and also a plurality, which may be any number, of channeled spokes 21, and also a radially inwardly extending bolting-on flange 26, Fig. 1, the latter in the embodiment of my invention shown in Fig. 1 being a portion of the single stamping, and in other illustrated embodiments being shown as a separate flanged annulus 33, welded by a portion 33A to the said single stamping.

The spoke and outer hub formation is such that said spokes merge very gradually and preferably curvilinearly with the outer hub, in such a way that localization of fatigue stresses in the region of joinder between the spokes and outer hub, is substantially eliminated, as compared with sheet metal wheels previously proposed, and many of which closely follow the usual forms of wood-spoked wheels.

This is accomplished by pressing the material of the substantially conical outer hub 22 outwardly at circumferentially spaced portions, to form what may be termed channelled spoke roots, which are disposed radially within the peripheral portion of said outer hub which is of greatest diameter, said spoke roots being in the form of channels which are of gradually increased cross-sectional form, being gradually increased in axial and radial depth.

The axially outer wall of said root channels generally extends axially inwardly at a lesser rate than the portions of the outer hub disposed between said spokes, due to a gradual general divergence of said spoke root outer walls from the conical configuration of outer hub determined more particularly by the portions of the outer hub disposed between and interconnecting said spokes, as shown for instance in the drawings in portions of the outer hub indicated by the reference numeral 22.

The gradual emergence of the spoke roots is moreover accomplished by so forming the lateral walls of said roots, as to cause them to curvilinearly and gradually merge with outwardly pressed portions of the outer hub which are disposed between the spokes and adjacent thereto.

The channelled spoke roots of gradually increasing depth as before stated, continue radially outwardly to the zone of the radial outer portion of the outer hub which is of greatest diameter, where said root portions are of greatest axial depth and where they smoothly merge with the main bodies of the spokes 21, which continue in channelled form to the spoke ends, being there joined to the annulus 20, herein shown as a tire rim.

The main bodies of the spokes 21, which are as stated of channelled form and therefore of high section modulus, are of substantially less axial depth than that of the generally conical hub 22, and the side walls of said channel spokes being also gradually and non-abruptly merged with the intermediate portions of the conical outer hub 22 so as to prevent substantial localization of fatigue stresses in the regions of joinder of said spokes and outer hub. The lateral walls of the spokes are prevented from spreading both by the interconnecting portions of the outer hub 22 between the spokes, the effect of which may obviously be increased by increasing the thickness of the material of the said single stamping, and also by the tying together of the side walls at the ends of the spokes by welding said ends in portions 21A, Fig. 3, to the annulus 20, and also in the embodiments of Figs. 1 and 14 by the bridging reinforcing elements 30 and 42 which are preferably welded to said side walls. In those embodiments in which rear spoke closures 30 and 42 are not present, i. e., as in Figs. 10 and 15, the side walls of the spokes are prevented from lateral spreading by the annulus 37, in Fig. 10, and the annulus 44, in Fig. 15, which are welded to the outer hub intermediate the spokes and adjacent the side walls thereof where they emerge from the outer hub 22.

It is to be noted also that the said outer hub 22 is substantially circumferentially continuous at its end which is of least diameter and which in Figs. 1 and 9 also includes the circumferentially continuous bolting-on flange 26, but said outer hub becomes more and more corrugated by the emergence of the spoke roots and the main bodies of the spokes in portions more nearly approaching the portions of the outer hub which is of greatest diameter. The high section modulus of the outer hub otherwise accruing from its generally deeply dished conical form is, however, substantially maintained, in spite of said corrugations, by the reinforcing effect of the welded-on annuli comprising the element 28, Fig. 1, the element 33, Fig. 7, the element 44, Fig. 15, the element 37, Fig. 10 and the element 41, Fig. 14, which are secured at the sides of each of said spokes, preventing lateral spreading thereof.

In Figs. 1 and 15 the drop portion of the rim 20 is filled with a material, designated 49, which may be pressed wood pulp, papier mâché, cemented and compresed granulated cork, rubber compound, or other material, placed in the drop section so as to keep the tire, tire tube or tire flap from entering it and thus prevent a flat tire coming off the rim. Instead of filling the drop portion with a material such as described above, the outer portion of the drop section may be otherwise closed, as by welding a closing covering strip to the rim. For example, in Fig. 10 the drop section is closed by a circular strip 50 extending all the way around the rim and substantially U-shaped in cross-section, the sides being welded at a plurality of points to the tapered sides of the drop section. In Fig. 14, the drop section is closed by a circular ring 51 of flat material which is welded to the rim at or adjacent the outer portions of the sides of the drop section.

These improvements in a rim of the type having a drop portion with the drop portion either filled or closed to the entrance of the tire, tire tube or flap are not claimed herein but constitute the subject matter of a companion application Serial No. 606,574, filed April 21, 1932.

Thus it will be seen that the objects stated at the beginnning of the specification are attained very effectively by the present invention. It will be apparent also that the invention in its broadest aspects is susceptible of numerous modifications or forms, some of which are herein illustrated and claimed. I therefore aim in my claims to cover all modifications which do not involve a departure from the spirit and scope of the invention in its broadest aspects.

Having thus described my invention, I claim:

1. In combination, an inner hub, and a hub demountable wheel detachably secured thereto and comprising a rim, a spoke stamping composed of spokes secured to the rim at their outer ends and at their inner ends merging into and forming an outer hub, said outer hub having at its outer end a portion adapted to be bolted to an outer portion of the inner hub and having an inner portion engageable with an inner portion of the inner hub, said inner portion of the outer hub being extended on the inner side of the wheel to the rim and secured thereto.

2. In combination, an inner hub, and a hub demountable wheel detachably secured thereto and comprising a rim, a spoke stamping composed of spokes secured to the rim at their outer ends and at their inner ends merging into and forming an outer hub, said outer hub having at its outer end a portion adapted to be bolted to an outer portion of the inner hub and having an inner portion engageable with an inner portion of the inner hub, said inner portion of the outer hub being extended on the inner side of the wheel and secured to the spokes and the rim.

3. In combination, an inner hub, and a hub demountable wheel detachably secured thereto and comprising a rim, a spoke stamping composed of hollow spokes secured to the rim at their outer ends and at their inner ends merging into and forming an outer hub, said outer hub having at its outer end a portion adapted to be bolted to an outer portion of the inner hub and having an inner portion engageable with an inner portion of the inner hub, said inner portion of the outer hub being extended outwardly on the inner side of the wheel and having portions secured to and closing the inner sides of the spokes.

4. In combination, an inner hub, and a hub demountable wheel detachably secured thereto and comprising a rim, a spoke stamping composed of channelled spokes secured to the rim at their outer ends and at their inner ends merging into and forming an outer hub, said outer hub having at its outer end a portion adapted to be secured to an outer portion of the inner hub and having an inner portion engageable with an inner portion of the inner hub, said portions of the outer hub being formed by a member secured to the hub of the spoke stamping between the spokes and having its inner end extended outwardly to close the open inner sides of the spokes.

5. In combination, an inner hub, and a hub demountable wheel detachably secured thereto and comprising a rim, a spoke stamping composed of spokes secured to the rim at their outer ends and at their inner ends merging into and forming an outer hub, said outer hub having at its outer end a portion adapted to be secured to an outer portion of the inner hub and having an inner portion engageable with an inner portion of the inner hub, said portions of the outer hub being formed by a member secured within and to the spoke stamping between the spokes and having its inner end extended outwardly and secured to the spokes.

6. In combination, an inner hub, and a hub demountable wheel detachably secured thereto and comprising a rim, a spoke stamping composed of spokes secured to the rim at their outer ends and at their inner ends merging into and forming an outer hub, said outer hub having at its outer end a portion adapted to be secured to an outer portion of the inner hub and having an inner portion engageable with an inner portion of the inner hub, said portions of the outer hub being formed by a member secured within and to the spoke stamping between the spokes and having its inner end extended outwardly and secured to the rim.

7. In combination, an inner hub, and a hub demountable wheel detachably secured thereto and comprising a rim, a spoke stamping composed of spokes secured to the rim at their outer ends and at their inner ends merging into and forming an outer hub, said outer hub having at its outer end a portion adapted to be secured to an outer portion of the inner hub and having a conical inner portion engageable with an inner portion of the inner hub, said inner portion of the outer hub being formed by a member secured within and to the spoke stamping between the spokes and having its inner end extended outwardly and secured to the spokes and rim.

8. In combination, an inner hub, and a hub demountable wheel detachably secured thereto and comprising a rim, a spoke stamping composed of hollow spokes having normally open inner sides, said spokes being secured to the rim at their outer ends and at their inner ends merging into and forming an outer hub, said outer hub having at its outer end a portion adapted to be secured to an outer portion of the inner hub and having an inner portion engageable with an inner portion of the inner hub, said portions of the outer hub being formed by a member secured within and to the spoke stamping between the spokes and having its inner end extended outwardly in the form of arms which close the open inner sides of the spokes and are secured to the spokes and to the rim.

9. A wheel adapted to have bearing upon outer and inner flanges of an inner hub and to be secured to the outer flange, comprising a rim, sheet metal spokes, and an outer hub which includes a portion integral with the spokes, said outer hub being adapted to engage said two flanges of the inner hub and being so constructed that it will first engage one of the flanges and then, as the attaching means is tightened, the outer hub will flex sufficiently under the action of the attaching means to engage the other flange of the inner hub.

10. In combination with an inner hub having outer and inner wheel supporting flanges, of a demountable wheel having a rim, sheet metal spokes, and an outer hub including a part integral with and formed as a unit with said sheet metal spokes and having portions adapted to engage said flanges, and securing devices by which the outer hub is attached to the outer flange of the inner hub, the construction being such that when the wheel is applied to the inner hub and secured thereto the engagement of the outer hub will first take place with one of the flanges of the inner hub, and as the securing devices are tightened, the outer hub will flex at and adjacent where it is engaged by the securing means so as to cause the appropriate portion of the outer hub to engage and bear solidly on the other flange of the inner hub.

11. In a vehicle wheel, a rim supporting hub demountable substantially frustro-conical unitary sheet metal body comprising a substantially dissimilar pair of sheet metal stampings each having spoke portions, one of said stampings being pressed to substantially frustro-conical form, the second stamping comprising portions forming a backing for the first stamping, each of the spoke portions of the frustro-conical stamping being substantially channel-shaped, the lateral edge portions of each of the spoke portions of the second stamping received between and engaged by the borders of the rearwardly extending side walls of an associated spoke portion of the first stamping throughout substantially its entire length, the said second stamping being of relatively heavier material than said first stamping, both of said stampings provided with relatively telescoped substantially conical inwardly disposed nave portions, the nave portion of said second stamping reinforcing the nave portion of said first stamping and comprising a centrally disposed radial load supporting annulus for making demountable load supporting engagement with the inner hub of the wheel said second stamping supporting all of the radial load to which the wheel is subjected in use, and means for removably securing said load supporting annulus on to the inner hub of the wheel.

OSCAR U. ZERK.